US012530082B2

United States Patent
Perko et al.

(10) Patent No.: US 12,530,082 B2
(45) Date of Patent: Jan. 20, 2026

(54) HAPTIC TOUCH MODULE AND A METHOD FOR MANUFACTURING THE HAPTIC TOUCH MODULE

(71) Applicant: Aito BV, EJ Amsterdam (NL)

(72) Inventors: Panu Perko, Espoo (FI); Jari Toropainen, Espoo (FI)

(73) Assignee: Aito BV, Amsterdam (NL)

( * ) Notice: Subject to any disclaimer, the term of this patent is extended or adjusted under 35 U.S.C. 154(b) by 0 days.

(21) Appl. No.: 18/196,526

(22) Filed: May 12, 2023

(65) Prior Publication Data

US 2023/0376117 A1 Nov. 23, 2023

(30) Foreign Application Priority Data

May 19, 2022 (EP) ..................................... 22174387

(51) Int. Cl.
| | |
|---|---|
| *G06F 3/01* | (2006.01) |
| *G06F 3/0354* | (2013.01) |
| *G06F 3/044* | (2006.01) |
| *H10N 30/20* | (2023.01) |

(52) U.S. Cl.
CPC .......... *G06F 3/016* (2013.01); *G06F 3/03547* (2013.01); *G06F 3/044* (2013.01); *G06F 2203/04103* (2013.01); *H03K 2217/9607* (2013.01); *H10N 30/20* (2023.02)

(58) Field of Classification Search
None
See application file for complete search history.

(56) References Cited

U.S. PATENT DOCUMENTS

| | | | | |
|---|---|---|---|---|
| 2012/0062491 | A1* | 3/2012 | Coni | G06F 3/03547 345/173 |
| 2013/0250491 | A1* | 9/2013 | Alakontiola | G06F 1/1626 361/679.01 |
| 2017/0062153 | A1* | 3/2017 | Ben Abdelaziz | B60K 35/10 |
| 2017/0336891 | A1* | 11/2017 | Rosenberg | G06F 3/04144 |
| 2017/0357325 | A1* | 12/2017 | Yang | G06F 3/0443 |
| 2019/0339776 | A1* | 11/2019 | Rosenberg | G06F 3/045 |
| 2021/0208682 | A1* | 7/2021 | Knoppert | G06F 3/0202 |
| 2021/0240266 | A1* | 8/2021 | Gajiwala | G06F 3/03547 |
| 2021/0240270 | A1* | 8/2021 | Knoppert | H01H 13/85 |
| 2021/0240282 | A1* | 8/2021 | Gajiwala | G06F 3/016 |
| 2021/0240805 | A1* | 8/2021 | Knoppert | G06F 3/023 |
| 2021/0263610 | A1* | 8/2021 | Yang | G06F 3/03547 |

(Continued)

FOREIGN PATENT DOCUMENTS

EP 3340016 A1 6/2018

OTHER PUBLICATIONS

Extended European Search Report for corresponding EP Application No. 22174387.5 dated Oct. 11, 2022 (7 pages).

*Primary Examiner* — Patrick N Edouard
*Assistant Examiner* — Peijie Shen
(74) *Attorney, Agent, or Firm* — Leydig, Voit & Mayer, Ltd.

(57) ABSTRACT

A haptic touch module (124, 170) comprises a bottom plate (100, 140) comprising a recess (102, 172); a haptic sensor (104, 152) mounted in the recess (102, 172); a capacitive sensor printed circuit board assembly (106, 160) mounted on the haptic sensor (104, 152); and an overlay (108, 164) mounted on the capacitive sensor printed circuit board assembly (106, 160), the overlay (108, 164) having a length and width covering the bottom plate (100, 140).

15 Claims, 5 Drawing Sheets

(56) References Cited

U.S. PATENT DOCUMENTS

| | | | |
|---|---|---|---|
| 2021/0278946 A1* | 9/2021 | Rosenberg | G06F 3/045 |
| 2021/0311533 A1* | 10/2021 | Yamashita | H01Q 1/22 |
| 2021/0325973 A1* | 10/2021 | Knoppert | G06F 1/1616 |
| 2021/0333880 A1* | 10/2021 | Junus | G06F 3/045 |
| 2021/0357045 A1* | 11/2021 | Kadowaki | G06F 3/04142 |
| 2022/0011868 A1* | 1/2022 | Junus | G06F 3/045 |
| 2022/0334645 A1* | 10/2022 | Junus | G06F 3/045 |
| 2023/0200204 A1* | 6/2023 | Lee | G06F 1/1656 257/72 |
| 2023/0315214 A1* | 10/2023 | Lochun | G06F 1/169 345/168 |

\* cited by examiner

HAPTIC TOUCH MODULE AND A METHOD FOR MANUFACTURING THE HAPTIC TOUCH MODULE

FIELD OF THE INVENTION

The invention concerns the technology of generating haptic effects in electromechanical user interface devices. In particular the invention concerns a solution for providing a haptic touch module.

BACKGROUND OF THE INVENTION

Piezoelectric elements are commonly used to generate haptic effects, i.e. recreation of the sense of touch by applying forces, vibrations, or motions to the user, in input devices such as touchkeys, touchscreens, touchpads and the like. For example, a piezoelectric element can be used both to sense a pressing force applied by the user and to generate the haptic feedback. The first-mentioned involves sensing a voltage that the piezoelectric element generates in response to mechanical deformation, and the latter involves applying a voltage waveform to the piezoelectric element that temporarily deforms it mechanically, causing a corresponding elastic movement in the surrounding structures.

A challenge with a haptic touchpad of a device, for example, a mobile device, may be how to implement the haptic touchpad in an efficient manner at the same time enabling, for example, serviceability.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may provide a solution that may enable benefits to a production process, quality and serviceability of a haptic touch module. This benefit may be achieved by the features of the independent claims. Further implementation forms are provided in the dependent claims, the description, and the drawings.

According to a first aspect there is provided a haptic touch module. The haptic touch module comprises a bottom plate comprising a recess, a haptic sensor mounted in the recess, a capacitive sensor printed circuit board assembly mounted on the haptic sensor, and an overlay mounted on the capacitive sensor printed circuit board assembly, the overlay having a length and width covering the bottom plate. This may enable implementing the haptic touch module as a separate module providing benefits to a production process, quality and service.

According to an embodiment of the first aspect, the haptic touch module further comprises an adhesive configured between the bottom plate and the overlay, the adhesive having an opening matching with a length and width of the capacitive sensor printed circuit board assembly. This may enable a solution to reliably attach the elements in the haptic touch module to each other.

According to an embodiment of the first aspect, the haptic touch module further comprises an overlay adhesive configured between the capacitive sensor printed circuit board assembly and the overlay. This may enable a solution to reliably attach the elements in the haptic touch module to each other.

According to an embodiment of the first aspect, the haptic touch module further comprises an electronics module integrated into the capacitive sensor printed circuit board assembly to control the haptic sensor and the capacitive sensor printed circuit board assembly. This may enable an efficient solution for space utilization in the haptic touch module.

According to an embodiment of the first aspect, the haptic touch module further comprises an electronics module configured to control the haptic sensor and the capacitive sensor printed circuit board assembly, the electronics module being attached to the bottom plate. This may enable a solution for placing the electronics module to a desired location in the haptic touch module.

According to an embodiment of the first aspect, the haptic touch module further comprises a bottom plate adhesive configured to attach the bottom plate to a cover structure. This may enable a solution to reliably attach the haptic touch module to an external element.

According to an embodiment of the first aspect, the haptic sensor comprises a plurality of piezo elements and the bottom plate comprises a plurality of through holes and/or cavities, each through hole and cavity being located under a corresponding piezo element. This may enable a downward bending of the piezo elements, for example, when providing haptic feedback. Further, a cavity may prevent a piezo element from bending over its maximum allowed deflection.

According to an embodiment of the first aspect, the bottom plate comprises one or more through holes, and the haptic sensor comprises one or more through holes coinciding with the one or more through holes in the bottom plate. This may enable a solution in which, for example, connectors, cables, grounding elements (for example, wires, fabric, tape) and other components under capacitive sensor printed circuit board assembly can be routed through the haptic sensor and the bottom plate.

According to a second aspect there is provided a device comprising the haptic touch module of the first aspect.

According to a third aspect there is provided a method for manufacturing the haptic touch module of the first aspect. The method comprises mounting a haptic sensor in a recess of a bottom plate, mounting a capacitive sensor printed circuit board assembly on the haptic sensor, and mounting an overlay on the capacitive sensor printed circuit board assembly, the overlay having a length and width covering the bottom plate.

According to an embodiment of the third aspect, the method further comprises providing an adhesive between the bottom plate and the overlay, the adhesive having an opening matching with a length and width of the capacitive sensor printed circuit board assembly.

According to an embodiment of the third aspect, the method further comprises providing an overlay adhesive between the capacitive sensor printed circuit board assembly and the overlay.

According to an embodiment of the third aspect, the method further comprises attaching an electronics module configured to control the haptic sensor and the capacitive sensor printed circuit board assembly to the bottom plate.

According to an embodiment of the third aspect, the method further comprises providing a bottom plate adhesive for attaching the bottom plate to a cover structure.

According to an embodiment of the third aspect, the method further comprises providing a plurality of piezo elements in the haptic sensor; and providing a plurality of through holes and/or cavities in the bottom plate, each through hole and cavity being located under a corresponding piezo element.

According to an embodiment of the third aspect, the method further comprises providing one or more through holes in the bottom plate; and providing one or more through holes in the haptic sensor coinciding with the one or more through holes in the bottom plate.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
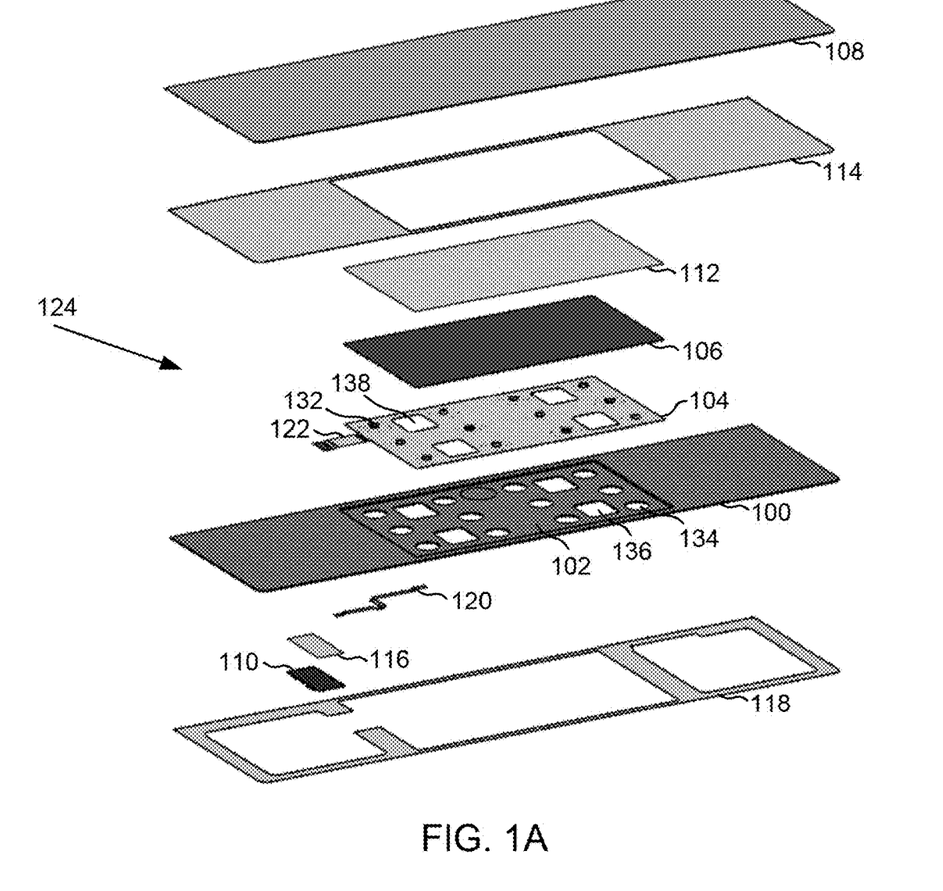
FIG. 1A illustrates a structure of a haptic touch module according to an example embodiment.

FIG. 1A illustrates a structure of a haptic touch module 124 according to an example embodiment. The haptic touch module 124 may be implemented, for example, as a haptic touchpad module. It should be noted that the example of FIG. 1A illustrates just one of a number of possible implementations. A variety of other possible implementations exist, as is clear to the person skilled in the art in the light of the following description of how the various parts of the haptic touch module 124 can be dimensioned and formed.

The haptic touchpad module 124 comprises a bottom plate 100 comprising a recess or cavity 102. The bottom plate 100 may also referred to as a bracket, a back plate, a back support, and a carrier. The bottom plate 100 may be made, for example, of a material having thickness, for example, of 0.8 mm. The material used may be, for example, a metal, steel, an aluminum alloy, a magnesium alloy, a plastic etc. In other embodiments, the thickness of the bottom plate 100 may be thinner or thicker than 0.8 mm, for example, between 0.5 mm-1.5 mm.

The haptic touchpad module 124 further comprises a haptic sensor 104 mounted in the recess 102. In an example embodiment, the haptic sensor 104 may comprise a top adhesive. The top adhesive may take any appropriate form. In FIG. 1A the top adhesive comprises a round dot on top of each piezo element 132 (this example including 12 piezo elements), and thus in this example there are 12 separate connecting points between the haptic sensor 104 and a capacitive sensor printed circuit board assembly 106. The haptic sensor 104 may further comprise a piezo foil comprising electrical tracks for contacting the piezo elements 132 to electronics and providing protection to the piezo elements 132. The piezo elements 132 may be attached under the piezo foil (for example, with an electrically conductive glue, by soldering or using any appropriate attachment solution). The haptic sensor 104 may further comprise a bottom adhesive surrounding the piezo elements 132 and extending to the full bottom area of the piezo foil. The haptic sensor 104 may further comprise an isolation adhesive for isolating the piezo elements 132 from the metal in the bottom plate 100. The isolation adhesive under the piezo elements 132 may have holes for enabling bending of the piezo elements 132. The isolation adhesive may have a thickness of approximately 0.15 mm. The isolation adhesive is not needed if the bottom plate 100 is electrically non-conductive. As a summary, the haptic sensor 104 may provide both sensing of a touch and a haptic feedback to a user.

In an example embodiment, the bottom plate 100 may comprise one or more openings or through holes. These may provide a benefit of a reduced weight for the bottom plate 100. Further, the openings can be used, for example, for components and/or filled with a filler foam to improve impact resistance. In an example embodiment, the bottom plate 100 may comprise one or more cavities or recesses. The depth of a cavity may be, for example, 0, 2 . . . 0.5 mm). A cavity may enable a downward bending of a piezo element, for example, when providing haptic feedback. Further, a cavity may prevent a piezo element from bending over its maximum allowed deflection, for example, in a misuse situation.

The haptic touchpad module 124 further comprises a capacitive sensor printed circuit board assembly 106 mounted on the haptic sensor 104. The capacitive sensor printed circuit board assembly 106 is configured detect touch provided by a user and provide control operations based on the touch. The recess 102 may be dimensioned such that its depth is appropriate to accommodate the haptic sensor 104 and the capacitive sensor printed circuit board assembly 106. In an example embodiment, the capacitive sensor printed circuit board assembly 106 may have a thickness of 0.5 mm-0.8 mm. In another example embodiment, the thickness may be 0.2 mm-1.6 mm depending on the construction.

The haptic touchpad module 124 further comprises an overlay 108 mounted on the capacitive sensor printed circuit board assembly 106. The overlay 108 is dimensioned such that it has a length and width covering the bottom plate 100, thus forming a seamless haptic touchpad module together with the other elements. In an example embodiment, the overlay 108 may be made, for example, of glass. In other example embodiments, also other materials or material combinations can be used, but not being limited to, for example, plastic, a metal, steel etc. In an example embodiment, the overlay 108 may have a thickness of, for example, 0.4 mm-1.0 mm. In case plastic is used as a material, the thickness may be up to 2 mm. In case a metal, for example, steel, is used as a material, the thickness may down to 0.2 mm.

In an example embodiment, a display or a display module may act as the overlay 108. Alternatively, an additional display or display module may be arranged in addition to the overlay 108 under the overlay 108. The display or display module may have one or more lay-ers. It is noted that in the discussion of the various embodiments above and/or below, the term "haptic touchpad module" may refer to a module having haptic touch functionality without display functionality or to a module having haptic touch functionality with display functionality. In the latter case, the module may be called also as a touch-sensitive haptic module.

In an example embodiment, an active area of the capacitive sensor printed circuit board assembly 106 may cover part of the overlay 108 or module surface. In another example embodiment, the active area of the capacitive sensor printed circuit board assembly 106 may fill the whole overlay area.

One or more of the elements of the haptic touchpad module 124 may be attached to each other using an adhesive. Any suitable adhesive may be used. In an example embodiment, the haptic touchpad module 124 may comprise an adhesive 114 configured between the bottom plate 100 and the overlay 108, the adhesive 114 having an opening matching with a length and width of the capacitive sensor printed circuit board assembly 112. Thus, the overlay 108 can be firmly attached to the bottom plate 100 with the adhesive 114. In an example embodiment, the haptic touchpad module 124 may comprise an overlay adhesive 112 configured between the capacitive sensor printed circuit board assembly 106 and the overlay 108. Thus, a top surface of the capacitive sensor printed circuit board assembly 106 can be firmly attached to the overlay 108 with the overlay adhesive 112.

In an example embodiment, the bottom plate 100 may be stiff enough for supporting the other parts of the haptic module, and for directing the haptic feedback to the overlay 108 and a user. In an example embodiment, the press from a finger of the user may only result in bending of the piezo element 132, not bending of the bottom plate 100 and the same with feedback. In an example embodiment, the bending of the piezo element 132 may result in movement in the overlay 108, not bending the bottom plate 100.

The bottom plate 100 may comprise one or more through holes 134, for example, round though holes, each through hole being located under a corresponding piezo element 132 and they may enable downwards bending of the piezo elements 132 (for example, when providing haptic feedback) and implements support for an outer edge of the piezo elements 132. The bottom plate 100 may comprise one or more cavities or recesses. A cavity arranged under a corresponding piezo element may prevent the piezo element from bending over its maximum allowed deflection.

The bottom plate 100 may comprise one or more through holes 136, for example, rectangular through holes 136, and the haptic sensor 104 may comprise one or more coinciding through holes 138, for example, rectangular through holes, as a space reservation for components in the capacitive sensor printed circuit board assembly 106. This may be advantageous due to the fact that the construction of the capacitive sensor printed circuit board assembly 106 is thin, connectors, cables, grounding elements (for example, wires, fabric, tape) and other components under the capacitive sensor printed circuit board assembly 106 "pass through" the haptic sensor 104 and the bottom plate 100, In an example embodiment, component heights can be up to 2 mm.

In an example embodiment, the haptic touchpad module 124 may comprise an electronics module 110 integrated into the capacitive sensor printed circuit board assembly 106 to control the haptic sensor 104 and the capacitive sensor printed circuit board assembly 106. This may enable a solution in which a separately implemented electronics module is not needed thus saving wiring and space in the haptic touchpad module 124. In another example embodiment, the haptic touchpad module 124 may comprise a separate electronics module 110 configured to control the haptic sensor 104 and the capacitive sensor printed circuit board assembly 106, the electronics module 110 being attached to the bottom plate 100, for example, using an adhesive 116, one or more screws, heat stacking or any appropriate attaching method. In another example embodiment, the electronics module 110 may be attached to the overlay 108 and a through hole may be arranged in the bottom plate 100 to accommodate the electronics module 110.

The haptic sensor 104 may be connected to the electronics module 110 with a connecting cable 122 and the capacitive sensor printed circuit board assembly 106 may be connected to the electronics module 110 with a connecting cable 120.

Figure 1B:
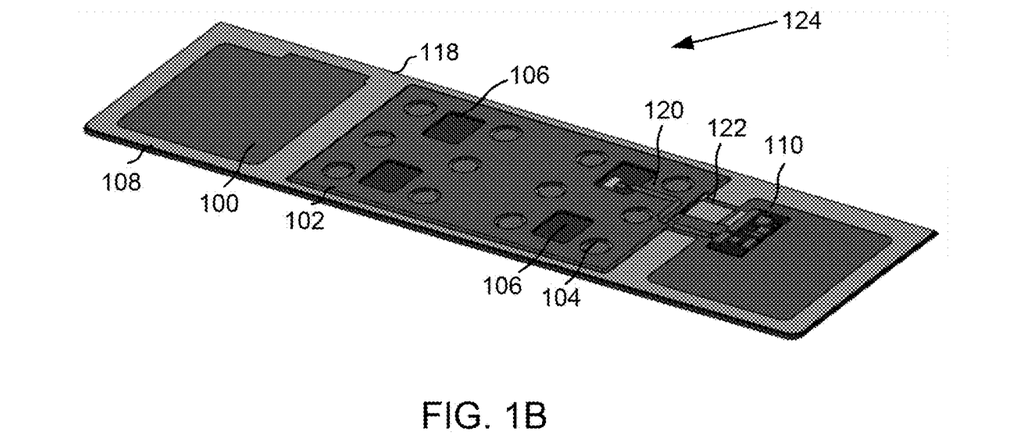
FIG. 1B illustrates an example view of the haptic touch module according to an example embodiment.
Figure 1C:
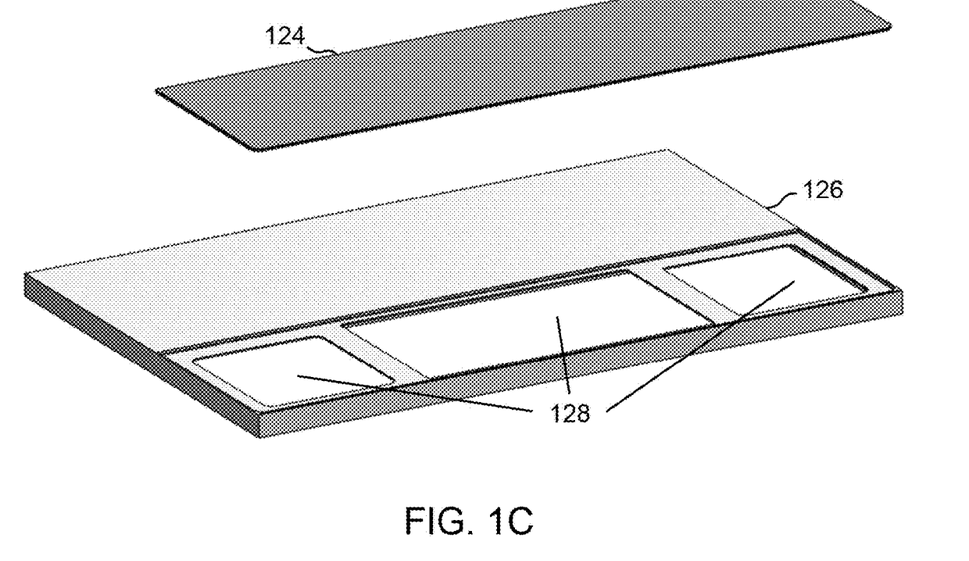
FIG. 1C illustrates the haptic touch module and a cover structure according to an example embodiment.
Figure 1D:
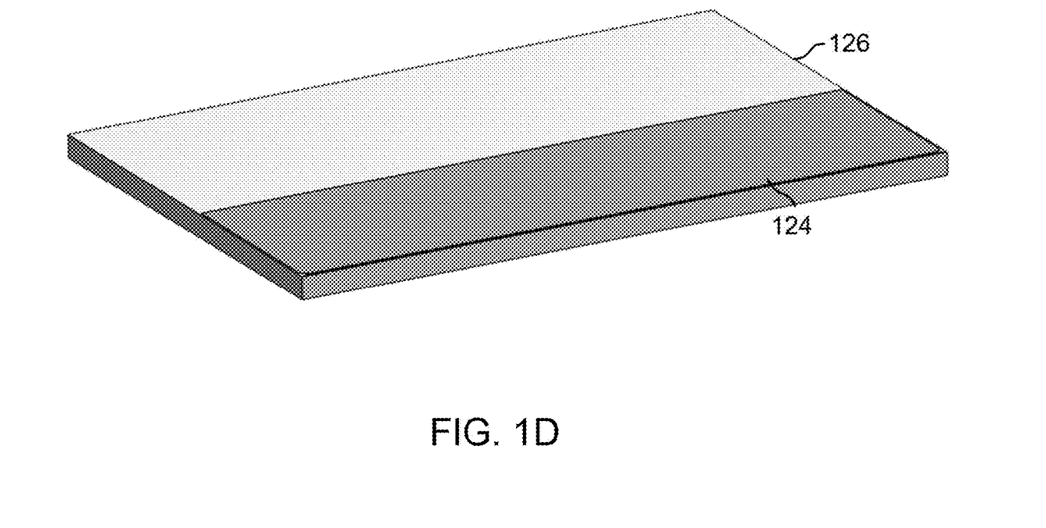
FIG. 1D illustrates a haptic touch module and cover assembly according to an example embodiment.
Figure 1E:
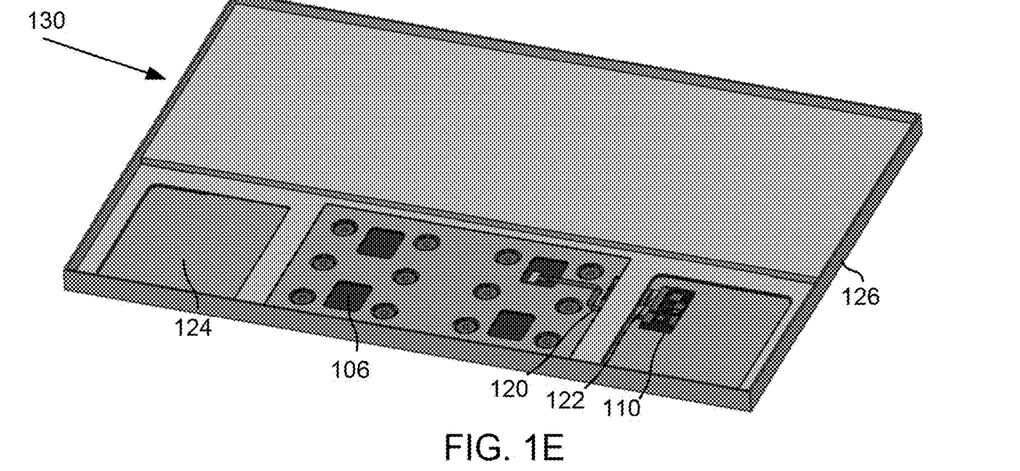
FIG. 1E illustrates another view of the haptic touch module and cover assembly according to an example embodiment.
Figure 1F:
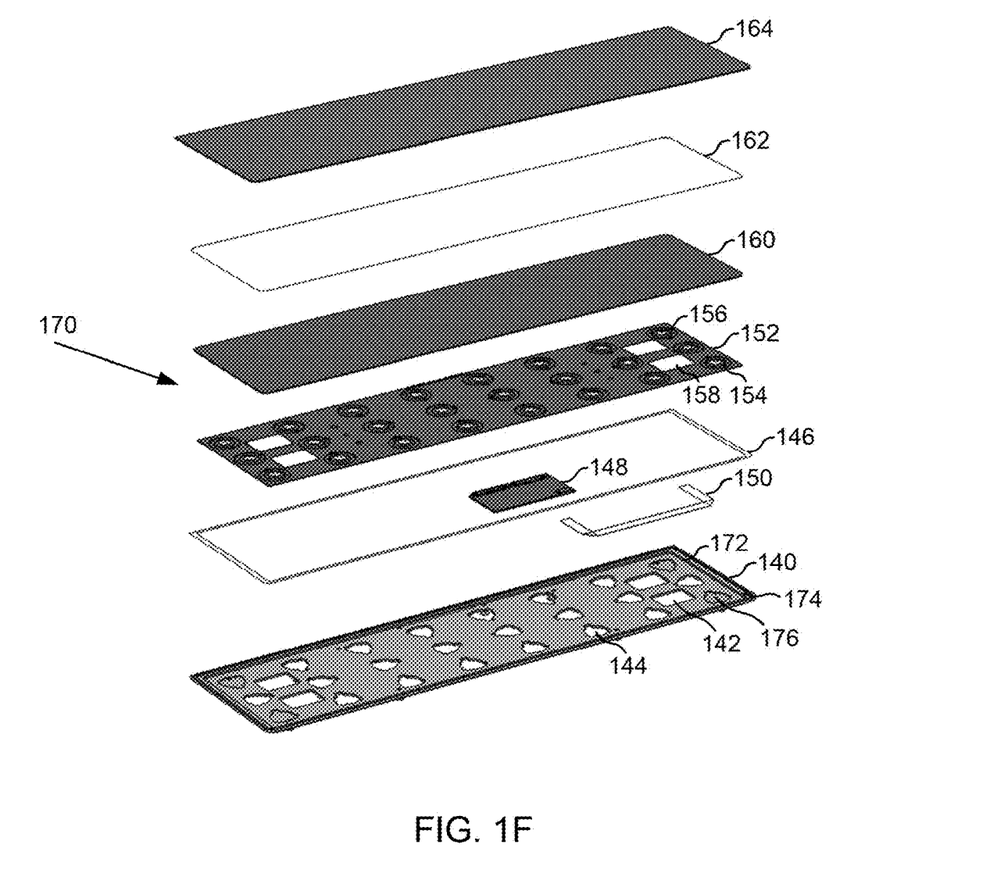
FIG. 1F illustrates a structure of a haptic touch module according to an example embodiment.
Figure 1G:
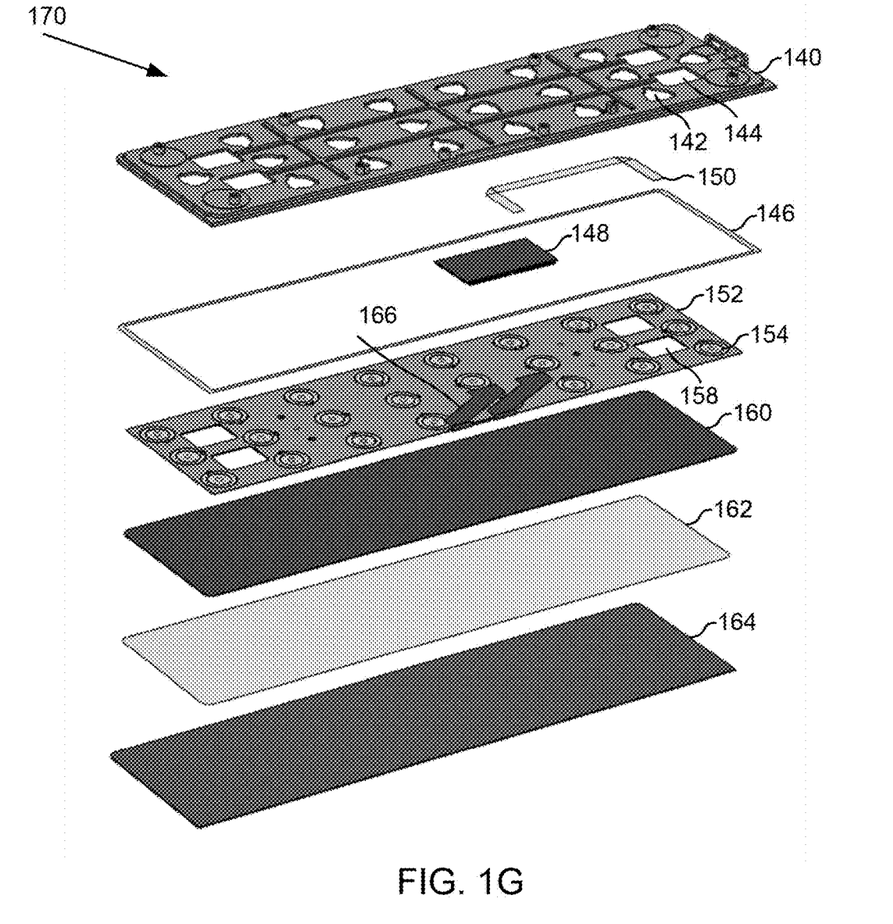
FIG. 1G illustrates a structure of a haptic touch module according to an example embodiment.

In an example embodiment, the haptic touchpad module 124 may comprise a bottom plate adhesive 118 configured to attach the haptic touchpad module 124 to a cover structure 126 illustrated in FIG. 1G. As illustrated in FIG. 1A, the bottom plate adhesive 118 may be shaped such that it provides constant attachment section at all (or almost all) locations where the bottom plate 100 contacts the cover structure 126. In another example embodiment, the bottom plate adhesive 118 may be made from several parts with different thicknesses and materials. In another example embodiment, the haptic touchpad module 124 may be attached to the cover structure 126 with screw mounting, rivets, snap fits, heat stacking, or combination any of these and not being limited to these methods.

FIG. 1B illustrates an example view of the haptic touch module 124 according to an example embodiment. The haptic touch module 124 may be implemented, for example, as a haptic touchpad module. The view illustrated in FIG. 1B provides a bottom view of the haptic touchpad module 124, i.e. a side of the haptic touchpad module 124 that is mounted towards the cover structure 126.

FIG. 1C illustrates the haptic touch module 124 and the cover structure 126 according to an example embodiment. The haptic touch module 124 may be implemented, for example, as a haptic touchpad module. In FIG. 1C, the haptic touchpad module 124 and the cover structure 126 are still separated from each other. From FIG. 1C it can be seen that, in an example embodiment, openings 128 may be arranged in the cover structure 126, the openings 128 being configured to match with the form of the bottom plate 100.

FIG. 1D illustrates a haptic touch module and cover assembly 130 according to an example embodiment. The haptic touch module 124 may be implemented, for example, as a haptic touchpad module. In FIG. 1D the haptic touchpad module 124 has been mounted on the cover structure 126. The bottom plate adhesive 118 faces appropriate surfaces of the cover structure 126 thus enabling firm attachment of the haptic touchpad module 124 to the cover structure 126.

FIG. 1E illustrates another view of the haptic touch module and cover assembly 130 according to an example embodiment. The view illustrated in FIG. 1E is a view below the haptic touch module and cover assembly 130. It can be seen there that the electronics module 110 may be implemented as a separate module from the capacitive sensor printed circuit board assembly 106.

FIG. 1F illustrates a structure of a haptic touch module 170 according to an example embodiment. The haptic touch module 170 may be implemented, for example, as a haptic touchpad module. It should be noted that the example of FIG. 1F illustrates just one of a number of possible implementations. A variety of other possible implementations exist, as is clear to the person skilled in the art in the light of the following description of how the various parts of the haptic touch module 170 can be dimensioned and formed.

The haptic touchpad module 170 comprises a bottom plate 140 comprising a recess or cavity 172. Contrary to the example embodiment illustrated in FIG. 1A, in this example embodiment the recess 172 extends close to the border of the bottom plate 140. The bottom plate 140 may also referred to as a bracket, a back plate, a back support, and a carrier. The bottom plate 140 may be made, for example, of a material having thickness, for example, of 0.8 mm. The material used may be, for example, a metal, steel, an aluminum alloy, a magnesium alloy, a plastic etc. In other embodiments, the thickness of the bottom plate 140 may be thinner or thicker than 0.8 mm, for example, between 0.5 mm-1.5 mm. The haptic touchpad module 170 further comprises a haptic sensor 152 mounted in the recess 172. In an example embodiment, the haptic sensor 152 may comprise a top adhesive 156. The top adhesive 156 may take any appropriate form. In FIG. 1F the top adhesive 156 comprises a round dot on top of each piezo element 154 (this example including 24 piezo elements), and thus in this example there are 24 separate connecting points between the haptic sensor 152 and a capacitive sensor printed circuit board assembly 160. The haptic sensor 152 may further comprise a piezo foil comprising electrical tracks for contacting the piezo elements 154 to electronics and providing protection to the piezo elements 154. The piezo elements 154 may be attached under the piezo foil (for example, with an electrically conductive glue, by soldering or using any appropriate attachment solution). The haptic sensor 140 may further comprise a bottom adhesive surrounding the piezo elements 154 and extending to the full bottom area of the piezo foil. The haptic sensor 152 may further comprise an isolation adhesive for isolating the piezo elements 154 from the metal in the bottom plate 140. The isolation adhesive under the piezo elements 154 may have holes for enabling bending of the piezo elements 154. The isolation adhesive may have a thickness of approximately 0.15 mm. The isolation adhesive is not needed if the bottom plate 140 is electrically non-conductive. As a summary, the haptic sensor 152 may provide both sensing of a touch and a haptic feedback to user.

In an example embodiment, the bottom plate 140 may comprise one or more openings or through holes. These may provide a benefit of a reduced weight for the bottom plate 140. Further, the openings can be used, for example, for components and/or filled with a filler foam to improve impact resistance.

The haptic touchpad module 170 further comprises a capacitive sensor printed circuit board assembly 160 mounted on the haptic sensor 152. The capacitive sensor printed circuit board assembly 160 is configured detect touch provided by a user and provide control operations based on the touch. The recess 172 may be dimensioned such that its depth is appropriate to accommodate the haptic sensor 152 and the capacitive sensor printed circuit board assembly 160. In an example embodiment, the capacitive sensor printed circuit board assembly 160 may have a thickness of 0.5 mm-0.8 mm. In another example embodiment, the thickness may be 0.2 mm-1.6 mm depending on the construction.

The haptic touchpad module 170 further comprise an overlay or a top plate 164 mounted on the capacitive sensor printed circuit board assembly 160. The overlay 164 is dimensioned such that it has a length and width covering the bottom plate 140, thus forming a seamless haptic touchpad module together with the other elements. In an example embodiment, the overlay 164 may be made, for example, of glass. In other example embodiments, also other materials or material combinations can be used, but not being limited to, for example, plastic, a metal, steel etc. In an example embodiment, the overlay 164 may have a thickness of, for example, 0.4 mm-1.0 mm. In case plastic is used as a material, the thickness may be up to 2 mm. In case a metal, for example, steel, is used as a material, the thickness may down to 0.2 mm.

In an example embodiment, a display or a display module may act as the overlay 164. Alternatively, an additional display or display module may be arranged in addition to the overlay 164 under the overlay 164. The display or display module may have one or more lay-ers. It is noted that in the discussion of the various embodiments above and/or below, the term "haptic touchpad module" may refer to a module having haptic touch functionality without display functionality or to a module having haptic touch functionality with display functionality. In the latter case, the module may be called also as a touch-sensitive haptic module.

In an example embodiment, an active area of the capacitive sensor printed circuit board assembly 160 may cover part of the overlay 164 or module surface. In another example embodiment, the active area of the capacitive sensor printed circuit board assembly 160 may fill the whole overlay area.

One or more of the elements of the haptic touchpad module 170 may be attached to each other using an adhesive. Any suitable adhesive may be used. In an example embodiment, the haptic touchpad module 170 may comprise an adhesive 146 configured between the bottom plate 140 and the overlay 164. The bottom plate 140 may be formed such that the recess 172 additionally comprises a bezel section 174 in the edge of the bottom plate 140. The bezel section 174 may be configured to receive an adhesive 146 that attaches the overlay 164 to the bottom plate 140. Thus, the overlay 164 can be firmly attached to the bottom plate 140 with the adhesive 146. In an example embodiment, the haptic touchpad module 170 may comprise an overlay adhesive 162 configured between the capacitive sensor printed circuit board assembly 160 and the overlay 164. Thus, a top surface of the capacitive sensor printed circuit board assembly 160 can be firmly attached to the overlay 164 with the overlay adhesive 162.

In an example embodiment, the bottom plate 140 may be stiff enough for supporting the other parts of the haptic module, and for directing the haptic feedback to the overlay 164 and a user. In an example embodiment, the press from a finger of the user may only result in bending of the piezo element 154, not bending of the bottom plate 140 and the same with feedback. In an example embodiment, the bending of the piezo element 154 may result in movement in the overlay 164, not bending the bottom plate 140.

The bottom plate 140 may comprise one or more through holes 144, for example, round though holes, each through hole being located under a corresponding piezo element 154 and they may enable downwards bending of the piezo elements 154 (for example, when providing haptic feedback) and implements support for an outer edge of the piezo elements 154. In an example embodiment, the bottom plate 140 may comprise one or more cavities or recesses. The depth of a cavity may be, for example, 0, 2 . . . 0.5 mm). A cavity may enable a downward bending of a piezo element, for example, when providing haptic feedback. Further, a cavity may prevent a piezo element from bending over its maximum allowed deflection, for example, in a mis-use situation. The bottom plate 140 may comprise one or more through holes 142, for example, rectangular through holes, and the haptic sensor 152 may comprise one or more coinciding through holes 158, for example, rectangular through holes, as a space reservation for components in the capacitive sensor printed circuit board assembly 160. This may be advantageous due to the fact that the construction of the capacitive sensor printed circuit board assembly 160 is thin, connectors, cables, grounding elements (for example, wires, fabric, tape) and other components under the capacitive sensor printed circuit board assembly 160 "pass through" the haptic sensor 152 and the bottom plate 140, In an example embodiment, component heights can be up to 2 mm.

In an example embodiment, the haptic touchpad module 170 may comprise an electronics module 148 integrated into the capacitive sensor printed circuit board assembly 160 to control the haptic sensor 152 and the capacitive sensor printed circuit board assembly 160. This may enable a solution in which a separately implemented electronics module is not needed thus saving wiring and space in the haptic touchpad module 170. In another example embodiment, the haptic touchpad module 124 may comprise, as illustrated in FIG. 1F, a separate electronics module 148 configured to control the haptic sensor 152 and the capacitive sensor printed circuit board assembly 160, the electronics module 148 being attached to the bottom plate 140, for example, using an adhesive, one or more screws, heat stacking or any appropriate attaching method. The haptic sensor 152 may be connected to the electronics module 148 with a connecting cable 150 and the capacitive sensor printed circuit board assembly 160 may be connected to the electronics module 148 with a separate connecting cable.

In an example embodiment, the haptic touchpad module 170 may comprise a bottom plate adhesive configured to attach the haptic touchpad module 170 to a cover structure. The bottom plate adhesive may be made from one or more parts and they may have different thicknesses and materials. In another example embodiment, the haptic touchpad module 170 may be attached to the cover structure with screw mounting, rivets, snap fits, heat stacking, or combination any of these and not being limited to these methods.

FIG. 1G illustrates another view of the haptic touch module 170 according to an example embodiment. Compared to FIG. 1F, FIG. 1G additionally illustrates the connecting cable 166 from the haptic sensor 152 to the electronics module 148.

Figure 1H:
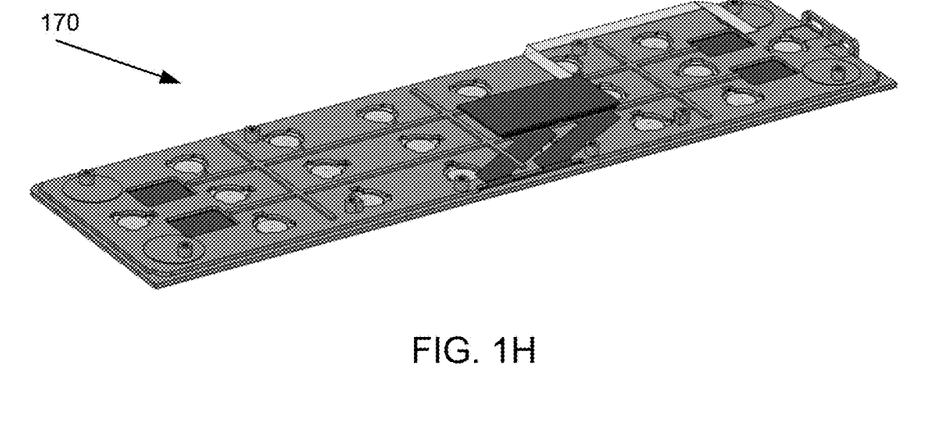
FIG. 1H illustrates an example view of the haptic touch module according to an example embodiment.

FIG. 1H illustrates an example view of the haptic touch module 170 according to an example embodiment. In FIG. 1H, the haptic touch module 170 is illustrated in an assembled form.

Figure 1I:
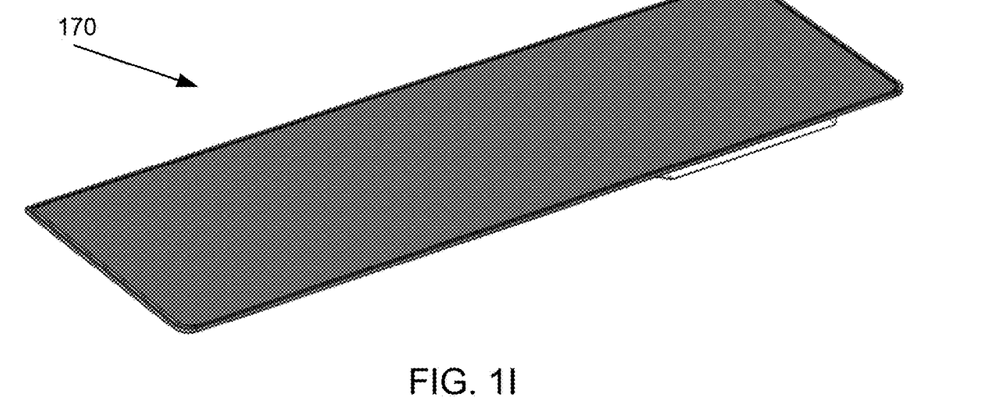
FIG. 1I illustrates an example view of the haptic touch module according to an example embodiment.

FIG. 1I illustrates an example view of the haptic touch module 170 according to an example embodiment. In FIG. 1I, the haptic touch module 170 is illustrated in an assembled form.

Figure 1J:
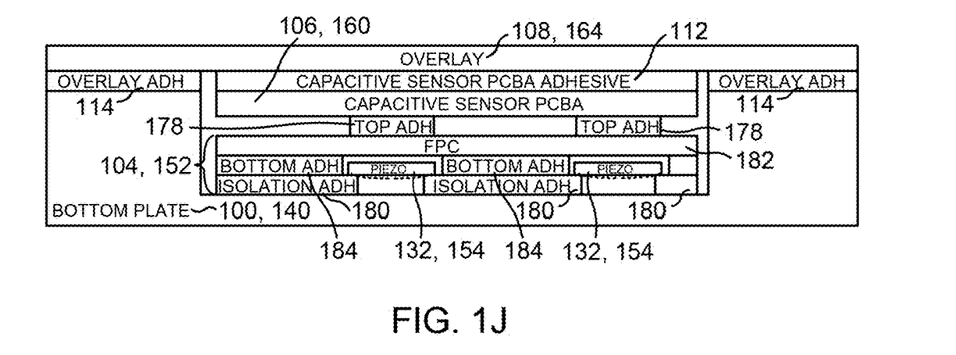
FIG. 1J illustrates a structural view of the haptic touch module according to an example embodiment.

FIG. 1J illustrates a structural view of the haptic touch module according to an example embodiment. The haptic touch module may be implemented, for example, as a haptic touchpad module.

The haptic touchpad module comprises a bottom plate 100, 140. The bottom plate 100, 140 may also referred to as a bracket, a back plate, a back support, and a carrier. The bottom plate 100, 140 may made, for example, of steel having thickness, for example, of 0.8 mm. In other embodiments, the material may be other than steel, and the thickness of the bottom plate 100 may be thinner or thicker than 0.8 mm. The haptic touchpad module further comprises a haptic sensor 104, 152 mounted in a recess arranged in the bottom plate 104, 152. The haptic sensor 104, 152 may comprise a flexible printed circuit 182 and a top adhesive 178. The top adhesive 178 may take any appropriate form. The top adhesive 178 may be arranged on top of each piezo element 132, 154. The haptic sensor 104, 152 may further comprise a piezo foil comprising electrical tracks for contacting the piezo elements 132, 154 to electronics and providing protection to the piezo elements 132. The piezo elements 132, 154 may be attached under the piezo foil (for example, with an electrically conductive glue, by soldering or using any appropriate attachment solution). The haptic sensor 104, 154 may further comprise a bottom adhesive 184 surrounding the piezo elements 132, 154 and extending to the full bottom area of the piezo foil. The haptic sensor 104, 152 may further comprise an isolation adhesive 180 for isolating the piezo elements 132, 154 from the metal in the bottom plate 100, 140. The isolation adhesive 180 is not needed if the bottom plate 100, 140 is electrically non-conductive.

The haptic touchpad module further comprises a capacitive sensor printed circuit board assembly 106, 160 mounted on the haptic sensor 104, 152. The haptic touchpad module may comprise an overlay adhesive 114 configured between the capacitive sensor printed circuit board assembly 106, 160 and an overlay 108, 164. In an example embodiment, the overlay 108, 164 may be made, for example, of glass. In other example embodiments, also other materials or material combinations can be used.

The haptic touchpad module discussed in any of the example embodiments above may be installed to a device, for example, a mobile device, a laptop, a mobile keyboard, a keypad etc. Further, in other embodiments, the haptic module discussed in any of the example embodiments above may be part of any user interface, for example, in a vehicle.

FIGS. 1A, 1B, 1F, 1G and 1H illustrated embodiments in which one or more through holes and/or cavities may be arranged in the bottom plate 100, 140. The example embodiment illustrated in FIG. 1J provides an alternative implementation in which the bottom plate 100, 140 may be kept flat and it does not comprise through holes and/or cavities. This may be enabled by a solution in which the isolation adhesive 180 in the haptic sensor 104, 152 is thick enough to enable bending for the piezo elements 132, 154. The isolation adhesive in this example embodiment may have a thickness of 0.40 mm or more to enable sufficient room for bending of the piezo elements 132, 154.

Figure 2:
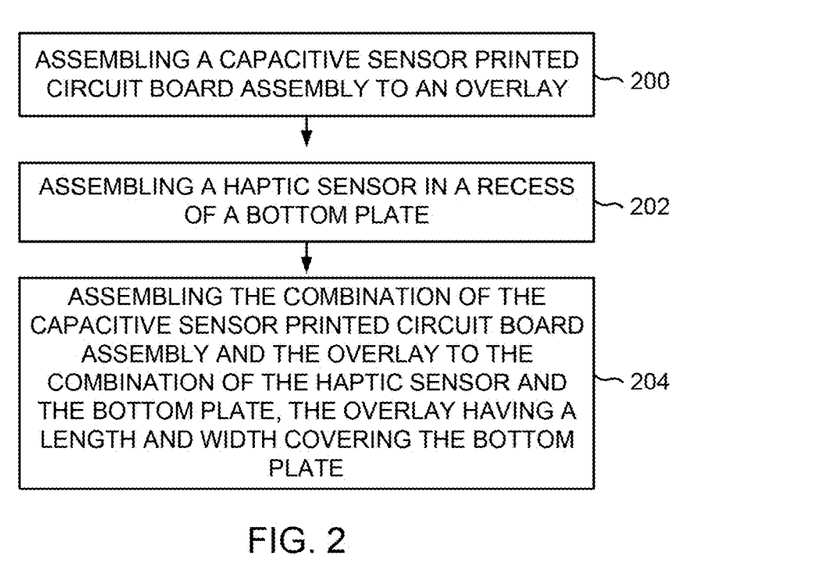
FIG. 2 illustrates a method for manufacturing the haptic touch module according to an example embodiment.

FIG. 2 illustrates a method for manufacturing the haptic touchpad module 124, 170 according to an example embodiment.

At 200 a capacitive sensor printed circuit board assembly 106, 160 may be assembled to an overlay 108, 164.

At 202 a haptic sensor 104, 140 may be assembled in a recess 102, 172 of a bottom plate 100, 140. The structure of the bottom plate 100, 140 and the haptic sensor 104, 142 can be seen, for example, from FIGS. 1A-1J.

At 204 the combination of the capacitive sensor printed circuit board assembly 106, 160 and the overlay 108, 164 may be assembled to the combination of the haptic sensor 104, 152 and the bottom plate 100, 140, the overlay 108, 164 having a length and width covering the bottom plate 100, 140. The capacitive sensor printed circuit board assembly 106, 160 may be assembled to the overlay 108, 164 using the overlay adhesive 112, 162 as illustrated in FIGS. 1A, 1F and 1G. The overlay 108, 164 may be assembled to the bottom plate 100, 140 using the adhesive 114, 146 as illustrated in FIGS. 1A, 1F and 1G.

As can be seen from FIGS. 1A-1J the end result is a module that can be separately installed to the cover structure 126.

In an example embodiment, an electronics module 110 may be configured to control the haptic sensor 104, 152 and the capacitive sensor printed circuit board assembly 106, 160, and the electronics module 110 may be attached to the bottom plate 100, for example, using the adhesive 116 as illustrated in FIG. 1A.

In an example embodiment, the method may further comprise providing a plurality of piezo elements 132, 154 in the haptic sensor 104, 152; and providing a plurality of through holes and/or cavities 134, 144, 176 in the bottom plate 100, 140, each through hole and cavity being located under a corresponding piezo element 132, 154.

In an example embodiment, the method may further comprise providing one or more through holes 136, 142 in the bottom plate 100, 140; and providing one or more through holes 138, 158 in the haptic sensor 104, 152 coinciding with the one or more through holes 136, 142 in the bottom plate 100, 140.

Although a specific assembly order of the components/elements has been discussed above, in another example embodiment, another assembly order may as well be used. For example, at 200 the haptic sensor 104, 152 may be mounted in the recess 102, 172 of the bracket bottom plate 140, at 202 the capacitive sensor printed circuit board assembly 106, 160 may be mounted on the haptic sensor 104, 152, and at 204 the overlay 108, 164 may be mounted on the capacitive sensor printed circuit board assembly 106, 160, the overlay 108, 164 having a length and width covering the bottom plate 100, 140.

One or more of the example and example embodiments discussed above may enable a module that can be assembled as one plug-and-play component into a device, for example, a laptop computer. Further, one or more of the example and example embodiments discussed above may enable benefits to a production process, quality and serviceability of the haptic touchpad.

It is obvious to a person skilled in the art that with the advancement of technology, the basic idea of the invention may be implemented in various ways. For example, dimensions and forms of the illustrated elements may vary. The invention and its embodiments are thus not limited to the examples described above, in-stead they may vary within the scope of the claims.

The invention claimed is:

1. A replaceable haptic touch module for an electronic device, comprising:
 a bottom plate comprising a recess;
 a haptic sensor mounted in the recess, wherein the haptic sensor comprises a plurality of piezo elements;
 a capacitive sensor printed circuit board assembly mounted on the haptic sensor, wherein the capacitive sensor printed circuit board assembly comprises one or more components; and
 an overlay mounted on the capacitive sensor printed circuit board assembly, the overlay having a length and width covering the bottom plate,
 wherein the recess has a depth that accommodates the haptic sensor and the capacitive sensor printed circuit board assembly,
 wherein the bottom plate comprises a plurality of first through holes and/or cavities, each first through hole and/or cavity being located under a corresponding piezo element,
 wherein the bottom plate comprises one or more second through holes, and the haptic sensor comprises one or more third through holes coinciding with the one or more second through holes in the bottom plate, the second and third through holes being horizontally spaced part from the first through holes and/or cavities,
 wherein the one or more components on the capacitive sensor printed circuit board assembly pass through the one or more second through holes in the bottom plate and the one or more third through holes in the haptic sensor, and
 wherein the replaceable haptic touch module is replaceable in the electronic device as a single pre-assembled module.

2. The replaceable haptic touch module according to claim 1, further comprising an adhesive configured between the bottom plate and the overlay, the adhesive having an opening matching with a length and width of the capacitive sensor printed circuit board assembly.

3. The replaceable haptic touch module according to claim 1, further comprising an overlay adhesive configured between the capacitive sensor printed circuit board assembly and the overlay.

4. The replaceable haptic touch module according to claim 1, further comprising an electronics module to control the haptic sensor and the capacitive sensor printed circuit board assembly, wherein the electronics module is disposed in the one or more second through holes in the bottom plate and the one or more third through holes in the haptic sensor.

5. The replaceable haptic touch module according to claim 1, further comprising an electronics module configured to control the haptic sensor and the capacitive sensor printed circuit board assembly, the electronics module being attached to the bottom plate.

6. The replaceable haptic touch module according to claim 1, further comprising a bottom plate adhesive configured to attach the bottom plate to a cover structure of the electronic device.

7. A device comprising a replaceable haptic touch module, wherein the replaceable haptic touch module comprises:
 a bottom plate comprising a recess;
 a haptic sensor mounted in the recess, wherein the haptic sensor comprises a plurality of piezo elements;
 a capacitive sensor printed circuit board assembly mounted on the haptic sensor, wherein the capacitive sensor printed circuit board assembly comprises one or more components; and
 an overlay mounted on the capacitive sensor printed circuit board assembly, the overlay having a length and width covering the bottom plate,
 wherein the recess has a depth that accommodates the haptic sensor and the capacitive sensor printed circuit board assembly,
 wherein the bottom plate comprises a plurality of first through holes and/or cavities, each first through hole and/or cavity being located under a corresponding piezo element,
 wherein the bottom plate comprises one or more second through holes, and the haptic sensor comprises one or more third through holes coinciding with the one or more second through holes in the bottom plate, the second and third through holes being horizontally spaced part from the first through holes and/or cavities,
 wherein the one or more components on the capacitive sensor printed circuit board assembly pass through the one or more second through holes in the bottom plate and the one or more third through holes in the haptic sensor, and wherein the replaceable haptic touch module is replaceable in the device as a single pre-assembled module.

8. A method for manufacturing a replaceable haptic touch module, the method comprising:
- assembling a capacitive sensor printed circuit board assembly to an overlay, wherein the capacitive sensor printed circuit board assembly comprises one or more components;
- assembling a haptic sensor in a recess of a bottom plate, wherein the haptic sensor comprises a plurality of piezo elements; and
- assembling the combination of the capacitive sensor printed circuit board assembly and the overlay to the combination of the haptic sensor and the bottom plate, the overlay having a length and width covering the bottom plate;
- wherein the recess has a depth that accommodates the haptic sensor and the capacitive sensor printed circuit board assembly;
- wherein the bottom plate comprises a plurality of first through holes and/or cavities, each first through hole and/or cavity being located under a corresponding piezo element;
- wherein the bottom plate comprises one or more second through holes, and the haptic sensor comprises one or more third through holes coinciding with the one or more second through holes in the bottom plate, the second and third through holes being horizontally spaced part from the first through holes and/or cavities,
- wherein the one or more components on the capacitive sensor printed circuit board assembly pass through the one or more second through holes in the bottom plate and the one or more third through holes in the haptic sensor, and
- wherein the replaceable haptic touch module is replaceable in an electronic device as a single pre-assembled module.

9. The method according to claim 8, further comprising: providing an adhesive between the bottom plate and the overlay, the adhesive having an opening matching with a length and width of the capacitive sensor printed circuit board assembly.

10. The method according to claim 8, further comprising: providing an overlay adhesive between the capacitive sensor printed circuit board assembly and the overlay.

11. The method according to claim 8, further comprising: attaching an electronics module configured to control the haptic sensor and the capacitive sensor printed circuit board assembly to the bottom plate.

12. The method according to claim 8, further comprising: providing a bottom plate adhesive for attaching the bottom plate to a cover structure of the electronic device.

13. The replaceable haptic touch module according to claim 1, wherein the plurality of first through holes and/or cavities are cavities configured to prevent the plurality of piezo elements from bending over a maximum deflection.

14. The device according to claim 7, wherein the plurality of first through holes and/or cavities are cavities configured to prevent the plurality of piezo elements from bending over a maximum deflection.

15. The method according to claim 8, wherein the plurality of first through holes and/or cavities are cavities configured to prevent the plurality of piezo elements from bending over a maximum deflection.

* * * * *